US011900895B2

United States Patent

(12) United States Patent
Shin et al.

(10) Patent No.: US 11,900,895 B2
(45) Date of Patent: Feb. 13, 2024

(54) DISPLAY DEVICE

(71) Applicant: SAMSUNG DISPLAY CO., LTD., Yongin-si (KR)

(72) Inventors: Dong Hee Shin, Asan-si (KR); Yong Hee Lee, Suwon-si (KR); Geun Ho Lee, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 168 days.

(21) Appl. No.: 17/192,341

(22) Filed: Mar. 4, 2021

(65) Prior Publication Data

US 2021/0366429 A1 Nov. 25, 2021

(30) Foreign Application Priority Data

May 21, 2020 (KR) ........................ 10-2020-0060893

(51) Int. Cl.
*G09G 3/36* (2006.01)

(52) U.S. Cl.
CPC ......... *G09G 3/3688* (2013.01); *G09G 3/3677* (2013.01); *G09G 2300/0426* (2013.01); *G09G 2330/08* (2013.01); *G09G 2330/10* (2013.01)

(58) Field of Classification Search
CPC ............... G09G 3/3688; G09G 3/3677; G09G 2300/0426; G09G 2330/08; G09G 2330/10; G02F 1/136259–136272; G02F 1/13629
See application file for complete search history.

(56) References Cited

U.S. PATENT DOCUMENTS

2012/0229395 A1* 9/2012 Shin ...................... G06F 3/0446 345/173
2014/0029228 A1* 1/2014 Yamaguchi ........... G02F 1/1345 361/784
2016/0195757 A1* 7/2016 Lim .................. G02F 1/133377 349/43
2018/0059449 A1* 3/2018 Kim .................. G02F 1/136286
2018/0292723 A1* 10/2018 Chang ............... G02F 1/136259
2019/0317373 A1* 10/2019 Kang .................. H01L 27/3265

FOREIGN PATENT DOCUMENTS

KR 10-2001-0100614 11/2001
KR 10-2002-0027729 4/2002
KR 10-2002-0078010 10/2002
KR 10-2012-0033584 4/2012

* cited by examiner

*Primary Examiner* — Nitin Patel
*Assistant Examiner* — Saifeldin E Elnafia
(74) *Attorney, Agent, or Firm* — F. CHAU & ASSOCIATES, LLC

(57) ABSTRACT

A display device including a first substrate, a gate line disposed on the first substrate and extending in a first direction and a data line disposed on the first substrate and extending in a second direction that crosses the first direction. A drain electrode is disposed on the first substrate. A first electrode is configured to connect with the drain electrode. The first electrode includes a first stem portion that extends in the first direction. The data line includes a first protruding portion and a second protruding portion. The first protruding portion and the second protruding portion have a larger width in the first direction than other portions of the data line. The first protruding portion overlaps the first stem portion of the first electrode in a third direction that is perpendicular to an upper surface of the first substrate.

21 Claims, 20 Drawing Sheets

DISPLAY DEVICE

CROSS-REFERENCE TO RELATED APPLICATION

This application claims priority under 35 U.S.C. § 119 to Korean Patent Application No. 10-2020-0060893, filed on May 21, 2020 in the Korean Intellectual Property Office, the disclosure of which is incorporated by reference in its entirety herein.

1. TECHNICAL FIELD

The present inventive concepts relate to a display device, and more particularly, to a display device in which wiring can be easily repaired.

2. DISCUSSION OF RELATED ART

A liquid crystal display is a widely used flat display device. A liquid crystal display is formed of two substrates having electrodes respectively formed thereon and a liquid crystal layer inserted between the two substrates. The liquid crystal layer controls the amount of light transmitted by the liquid crystal display through the application of a signal to the electrodes which re-orients liquid crystal molecules of the liquid crystal layer.

A thin film transistor substrate is one of the two substrates of the liquid crystal display. The thin film transistor substrate is used as a circuit board for independently driving each pixel in a liquid crystal display device or an organic light emitting diode (OLED) display, and the like.

The thin film transistor substrate may include a gate line that transmits a gate signal aid a data line that transmits a data signal. The gate line and data line may cross each other. A thin film transistor may be connected to the gate fine and the data line. A pixel electrode may be connected to the thin film transistor.

When a wire of the liquid crystal display is disconnected or short-circuited, the pixel becomes a defective pixel and a repair process needs to be performed. As the resolution of the liquid crystal display increases, the size of one pixel decreases. Therefore, the width of the wire also decreases and the repair process may be relatively difficult to perform.

SUMMARY

Exemplary embodiments of the present inventive concepts provide a display device in which a wire is easily repaired.

According to an exemplary embodiment of the present inventive concepts a display device includes a first substrate, a gate line disposed on the first substrate and extending in a first direction and a data line disposed on the first substrate and extending in a second direction that crosses the first direction. A drain electrode is disposed on the first substrate. A first electrode is configured to connect with the drain electrode. The first electrode includes a first stem portion that extends in the first direction. The data line includes a first protruding portion and a second protruding portion. The first protruding portion and the second protruding portion have a larger width in the first direction than other portions of the data line. The first protruding portion overlaps the first stem portion of the first electrode in a third direction that is perpendicular to an upper surface of the first substrate.

The gate line may include: a first gate line and a second gate line that extend in the first direction and are disposed apart from each other; and a gate electrode that connects the first gate line and the second gate line, and the second protruding portion may be disposed in an area between the first gate line and the second gate line.

The display device further includes a sustain electrode line that is disposed on the same layer as the gate line, wherein a part of the sustain electrode line may extend in the first direction in parallel with the gate line, and the second protruding portion may be disposed between the sustain electrode line and the gate line.

Widths of the first protruding portion and the second protruding portion in the first direction may be respectively 5 μm to 7 μm.

The display device may further include a sustain electrode line that is disposed in the same layer as the gate line, a part of the sustain electrode line may extend in the second direction in parallel with the data line, and the first protruding portion may overlap the sustain electrode line in a direction that is perpendicular to a plane of the first substrate.

The data line may be disposed at opposite edges of the first electrode, and the first electrode may receive a data voltage from one of the data lines.

The first protruding portion may protrude toward a center of the first electrode, and the second protruding portion may protrude in a direction that becomes closer to the drain electrode.

The first protruding portion may protrude in a direction that is away from a center of the first electrode, and the second protruding portion may protrude in a direction that is away from the drain electrode.

The first electrode may include: a second stem portion that perpendicularly crosses the first stem portion; a minute branch portion that is extended from the first stem portion and the second stem portion; and a protruding portion that is connected with the drain electrode, wherein the protruding portion and the second stem portion are disposed apart from each other.

According to another exemplary embodiment, a display device includes a first substrate, a plurality of gate lines disposed on the first substrate and extending in a first direction and a plurality of data lines disposed on the first substrate and extending in a second direction that crosses the first direction. The plurality of data lines includes a first protruding portion and a second protruding portion each having a larger width in the first direction than other portions of the plurality of data lines. An insulation layer is disposed on the plurality of data lines. The insulation layer includes a first opening overlapping the first protruding portion and a second opening overlapping the second protruding portion. A first electrode is disposed on the insulation layer. A repair wire is disposed on the insulation layer and overlaps a portion of a first data line of the plurality of data lines. The repair wire is configured to contact the first data line in the first opening overlapping the first protruding portion, and contact the first data line in the second opening overlapping the second protruding portion. The first electrode comprises a first stem portion that is parallel with the first direction. The first protruding portion overlaps the first stem portion of the first electrode in a third direction that is perpendicular to an upper surface of the first substrate.

The first electrode may include: a second stem portion that perpendicularly crosses the first stem portion; and a minute branch portion that is extended from the first stem portion and the second stem portion, and the first electrode and the repair wire may not overlap each other in a direction that is perpendicular to the plane of the substrate.

The gate line may include: a first gate line and a second gate line that extend in the first direction and are disposed apart from each other; and a gate electrode that connects the first gate line and the second gate line, and the second protruding, portion may be disposed between the first gate line and the second gate line.

The display device may further include a sustain electrode line that is disposed on the same layer as the gate line, wherein a part of the sustain electrode line may extend in a first direction in parallel with the gate line, and the second protruding portion may be disposed between the sustain electrode line and the gate line.

The first electrode may be connected with a drain electrode that is disposed on the same layer as the data line, the first protruding, portion may protrude in a direction toward a center of the first electrode, and the second protruding portion may protrude in a direction that becomes close to the drain electrode.

the first electrode is connected with a drain electrode that is disposed on the same layer as the data line, the first protruding portion protrudes in a direction that is away from a center of the first electrode, and the second protruding portion protrudes in a direction that is away from the drain electrode.

A data line that overlaps the repair wire among the plurality of data lines may have a disconnected area between the first protruding portion and the second protruding portion.

The repair wire may be disposed in parallel with the data line.

The repair wire may be disposed to not be parallel with the data line.

One of the gate lines, one of the data lines, and a first electrode that receives a voltage from the data line may form one pixel, and a pixel where the repair wire may be disposed does not emit light during operation of the display device.

According to another exemplary embodiment of the present inventive concepts, a display device includes a first substrate, a gate line disposed on the first substrate and extending in a first direction and a data line disposed on the first substrate and extending in a second direction that crosses the first direction. The data line includes a first protruding portion and a second protruding portion that are spaced apart from each other and each have a larger width than other portions of the data line. A drain electrode is disposed on the first substrate. A first electrode is configured to connect with the drain electrode. The first protruding portion and the second protruding portion form a connection shape therebetween. The connection shape is configured for receiving a repair wire. The first protruding portion and the second protruding portion have an increased contact area for contacting the repair wire.

According to the exemplary embodiments, a display device is provide in which wiring can be easily repaired.

BRIEF DESCRIPTION OF TU E DRAWINGS

DETAILED DESCRIPTION OF EXEMPLARY EMBODIMENTS

Figure 1:
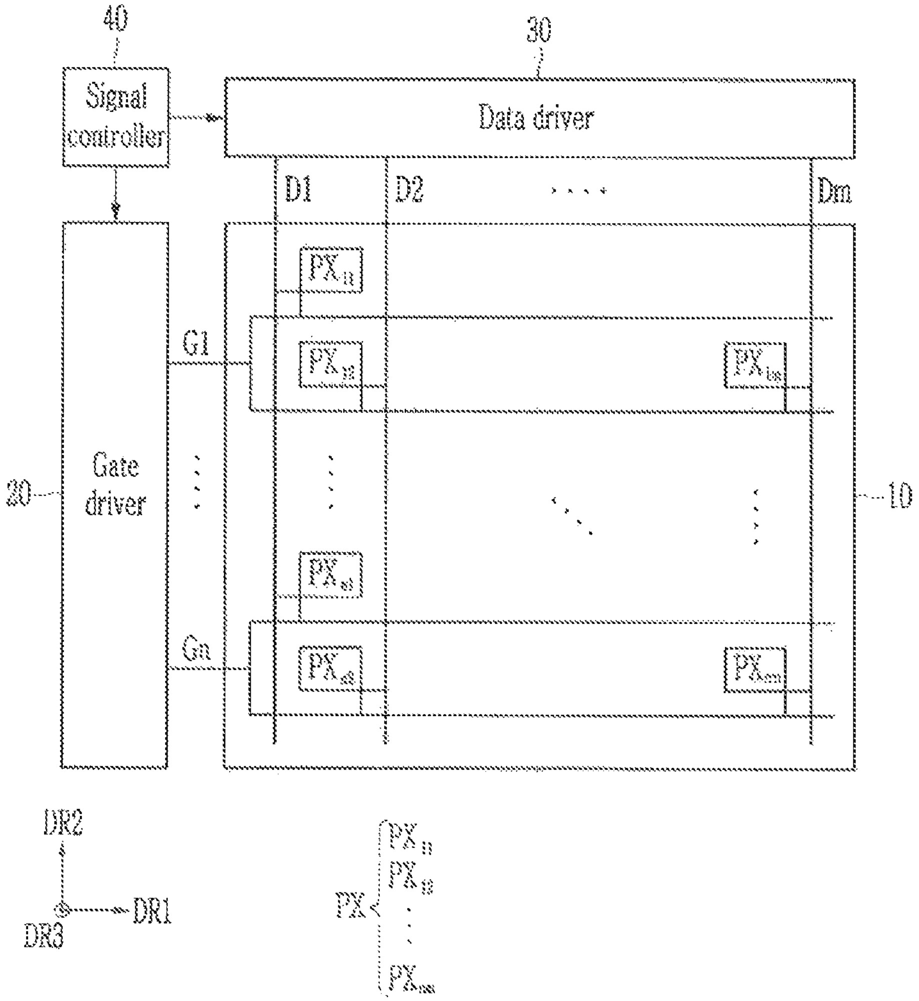
FIG. 1 is a layout view of a display device according to an exemplary embodiment of the present inventive concepts.

Hereinafter, the present inventive concepts will be described more fully with reference to the accompanying drawings, in which exemplary embodiments of the present inventive concepts are shown. As those skilled in the art would realize, the described exemplary embodiments may be modified in various different ways, all without departing from the spirit or scope of the present inventive concepts.

The drawings and description are to be regarded as illustrative in nature and not restrictive. Like reference numerals designate like elements throughout the specification.

In addition, since the size and thickness of each component shown in the drawings are arbitrarily shown for better understanding and ease of description, the present inventive concepts are not necessarily limited to what is illustrated in the drawings. In the drawings, the thickness of layers, films, panels, regions, etc., may be exaggerated for clarity. In addition, in the drawings, for better understanding and ease of description, the thickness of some layers and regions may be exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements.

In addition, in the entire specification, the phrase "connected to" does not mean only when two or more constituent elements are directly connected, but also means that two or more constituent elements are indirectly, physically, or electrically connected through other constituent elements, and further means that substantially integral parts are connected to each other although they are referred to by different names depending on a position or function.

Further, throughout the specification, the phrase "on a plane" means viewing a target portion from the top, and the phrase "on a cross-section" means viewing a cross-section formed by vertically cutting a target portion from the side.

Hereinafter, a display device according to an exemplary embodiment of the present inventive concepts will be described with reference to the accompanying drawings. FIG. 1 is a layout view of a display device according to an exemplary embodiment of the present inventive concepts.

Referring to FIG. 1, a display device according to an exemplary embodiment of the present inventive concepts includes a display portion 10, a gate driver 20, a data driver 30, and a signal controller 40.

The display portion 10 includes data lines D1 to Dm and gate lines G1 to Gn, and pixels PX that are connected to the data lines D1 to Dm and the gate lines G1 to Gn and arranged in a matrix format. As shown in the exemplary embodiment of FIG. 1, the gate lines G1 to Gn may extend substantially in a first direction DR1, and the data lines D1 to Dm may extend substantially in a second direction DR2 that crosses the first direction. For example, as shown in the exemplary embodiment of FIG. 1, the first direction DR1 and the second direction DR2 may be perpendicular to each other. However, exemplary embodiments of the present inventive concepts are not limited thereto. Each pixel PX may receive a gate signal that includes a gate-on voltage and a gate-off voltage through the gate lines G1 to Gn, and may receive a data voltage corresponding to an image signal through the data lines D1 to Dm when a transistor is turned on. The transistor is a switch that is turned on and turned off by the gate-on voltage and the gate-off voltage of the gate signal. The pixel PX is a unit that displays an image. In an exemplary embodiment, a single pixel may uniquely display one of primary colors. In an exemplary embodiment, a plurality of pixels may alternately display primary colors according to time such that a desired color may be displayed through a spatial or temporal sum of the primary colors.

Referring to FIG. 1, pixels disposed in parallel and arranged in the second direction DR2 may be connected to the same gate line. For example, a first gate line G1 may be connected to a 1-1 pixel $PX_{11}$ and a 1-2 pixel $PX_{12}$. In addition, pixels disposed in parallel and arranged in the second direction DR2 may be alternately connected to different data lines. For example, as shown in the exemplary embodiment of FIG. 1, the 1-1 pixel $PX_{11}$ may be connected to a first data line D1 and the 1-2 pixel $PX_{12}$ may be connected to a second data line D2. The first data line D1 and the second data line D2 may be arranged in the first direction DR1. This general arrangement may be repeated throughout the entire display portion 10. For example, two pixels that are adjacent to each other in the second direction DR2 may be connected to the same gate line, while being connected to different data lines.

Figure 2:
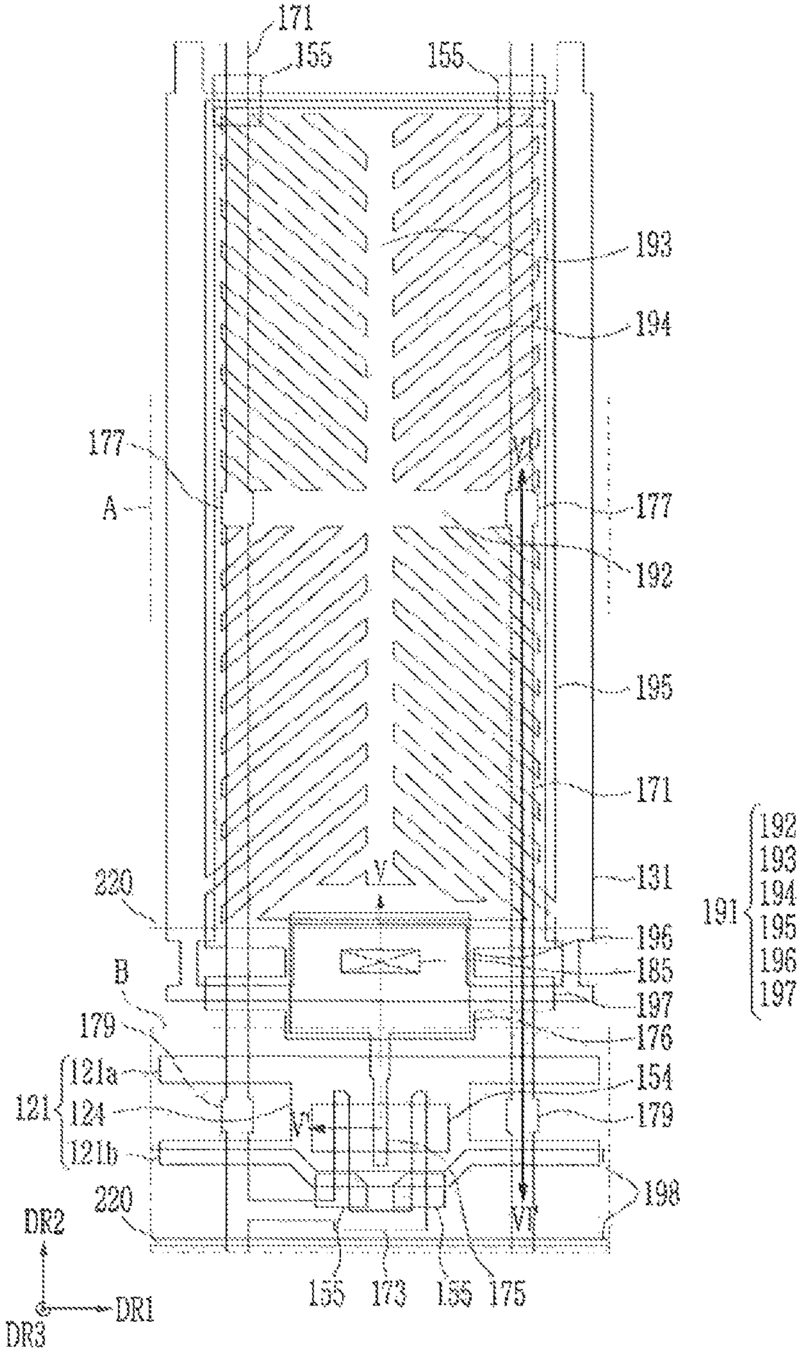
FIG. 2 is a layout view of the display device according to an exemplary embodiment of the present inventive concepts.
Figure 3:
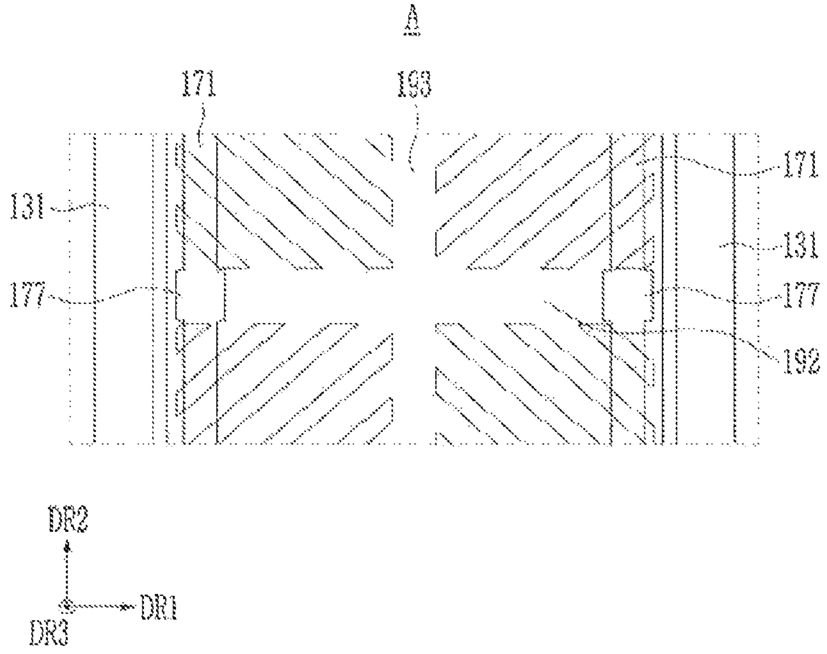
FIG. 3 is a layout view of the display device taken from portion A of FIG. 2 according to an exemplary embodiment of the present inventive concepts.
Figure 4:
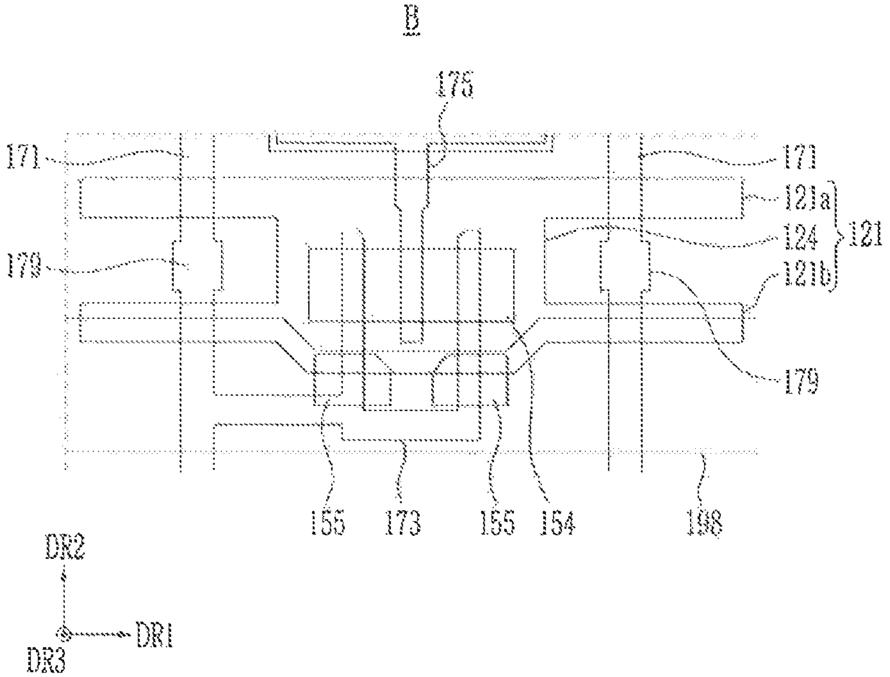
FIG. 4 is a layout view of a display device taken from portion B of FIG. 2 according to an exemplary embodiment of the present inventive concepts.
Figure 5:
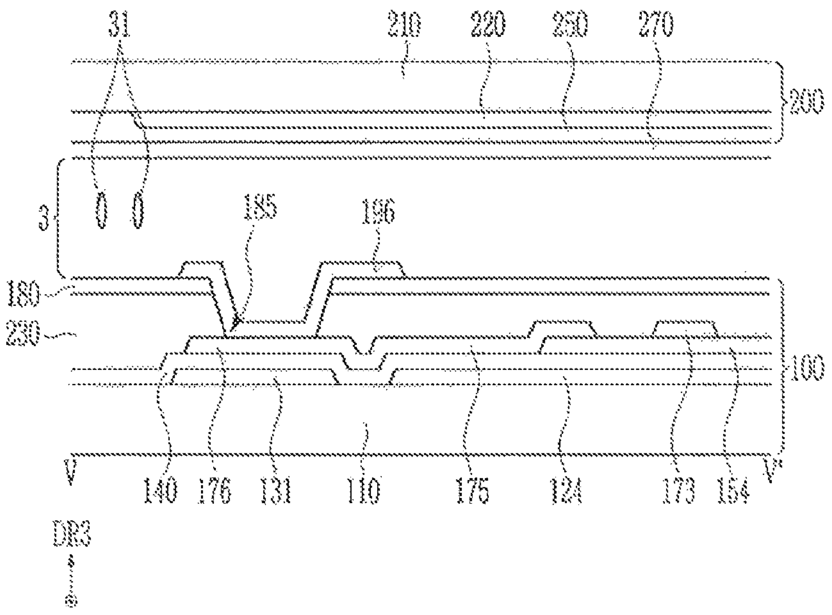
FIG. 5 is a crosssectional view of a display device taken along line V-V' of FIG. 2 according to an exemplary embodiment of the present inventive concepts.
Figure 6:
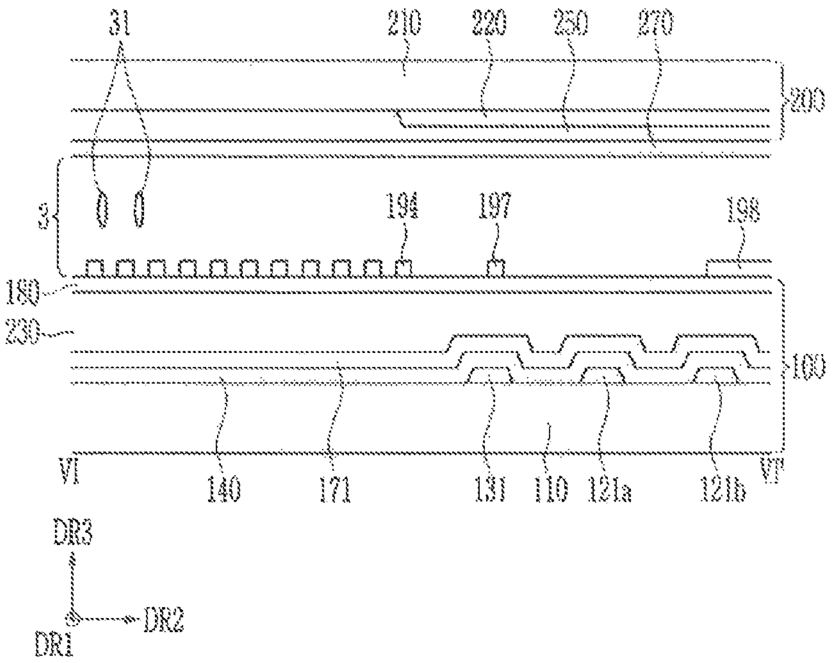
FIG. 6 is a cross-sectional view of a display device taken along line VI-VI' of FIG. 2 according to an exemplary embodiment of the present inventive concepts.

Hereinafter, the display device according to an exemplary embodiment of the present inventive concepts will be described in detail with reference to the drawings. FIG. 2 is a layout view of the display device according to an exemplary embodiment of the present inventive concepts. FIG. 3 illustrates only the portion A in FIG. 2, and FIG. 4 illustrates only the portion B in FIG. 2. FIG. 5 is a cross-sectional view of FIG. 2, taken along the line V-V', and FIG. 6 is a cross-sectional view of FIG. 2, taken along the VI-VI'.

Simultaneously referring to FIG. 2 to FIG. 6, the display device according to exemplary embodiments of the present inventive concepts includes a first display panel 100 and a second display panel 200 that are spaced apart from each other and face each other. For example, the first display panel 100 and the second display panel 200 may be spaced apart from each other in a third direction DR3 which is perpendicular to the first and second directions DR1, DR2 and which is perpendicular to upper surfaces of the first and second display panels 100, 200. A liquid crystal layer 3 is disposed between the first and second display panels 100 and 200 (e.g., in the third direction DR3).

First, the first display panel 100 will be described. Referring to the exemplary embodiments of FIG. 2 to FIG. 6, the first display panel 100 includes gate lines 121 disposed on a first substrate 110. In an exemplary embodiment, the first substrate 110 may be made of transparent glass or plastic.

The gate line 121 transmits a gate signal, and extends in the first direction DR1. The gate lines 121 are disposed in parallel with each other, and may include a first gate line 121*a* and a second gate line 121*b* that are spaced apart from each other (e.g., in the second direction DR2). While the exemplary embodiment of FIG. 2 shows the gate lines 121 as having two gate lines, exemplary embodiments of the present inventive concepts are not limited thereto and the number of the gate lines may vary in other exemplary embodiments. A gate electrode 124 may be disposed between the first gate line 121*a* and the second gate line 121*b*, and the first gate line 121*a* and the second gate line 121*b* may be connected to each other through the gate electrode 124. A semiconductor layer 154, a source electrode 173, and a drain electrode 175 are disposed on the gate electrode 124 and thus a transistor may be formed, and this will be described later.

Simultaneously referring to the exemplary embodiments of FIG. 2 to FIG. 6, a sustain electrode line 131 is disposed on the same layer as the gate line 121. The sustain electrode line 131 may be formed through the same process as the gate line 121 and may include the same material as the gate line 121. In an exemplary embodiment, the sustain electrode line 131 may be disposed at four sides that are adjacent to edges of a first electrode 191, such as the left and right lateral edges and the upper and lower edges of the first electrode 191. The sustain electrode line 131 may have a relatively larger width in an area that overlaps a protrusion portion 196 of the first electrode 191 as compared to other areas of the sustain electrode line 131.

Referring to the exemplary embodiments of FIG. 2 to FIG. 6, a gate insulation layer 140 is disposed on the gate line 121 and the sustain electrode line 131 (e.g., in the third direction DR3). For example, as shown in the exemplary embodiment of FIG. 6, a lower surface of the gate insulation layer 140 may directly contact upper and lateral side surfaces of the gate line 121, such as the first gate line 121*a* and the second gate line 121*b*. In an exemplary embodiment, the gate insulation layer 140 may include a silicon oxide or a silicon nitride. However, exemplary embodiments of the present inventive concepts are not limited thereto. The gate insulation layer 140 may have a multi-layered structure including two insulation layers, each having a different physical property.

The semiconductor layer 154 is disposed on the gate insulation layer 140. The semiconductor layer 154 may overlap the gate electrode 124 (e.g, in the third direction DR3). Referring to the exemplary embodiments of FIGS. 2 and 4, a plurality of semiconductor patterns 155 may be disposed on the same layer as the semiconductor layer 154. The plurality of semiconductor patterns 155 may be positioned at points where the gate lines 121 and the source electrode 173 cross each other. When the source electrode 173 is formed on the gate line 121, a short may occur in the gate line 121 and the source electrode 173 due to a step that is formed. In this case, when the semiconductor patterns 155 are located at the crossing areas between the gate lines 121 and the source electrode 173 as shown in the exemplary embodiment of FIGS. 2 and 4, a step formed in the wiring may be sufficiently compensated by the semiconductor pattern 155, thereby reducing possibility of a short circuit. In the exemplary embodiments of FIGS. 2, 4, the semiconductor patterns 155 are only partial illustrated only. However, the semiconductor patterns 155 may be positioned at other areas, such as areas where the gate lines 121 and data lines 171 cross each other, etc.

The data line 171 is disposed along the second direction DR2 and may include first and second data lines arranged in the first direction DR1 at opposite lateral edges of the first electrode 191. The data line 171 transmits a data signal, and extends in the second direction DR2 and thus crosses the gate line 121. The source electrode 173 extends from the data line. 171 (e.g., in the first direction DR1) and thus overlaps the gate electrode 124 (e.g., in the third direction DR3), and may substantially have the shape of a "U" (e.g., in a plan view in a plane defined by the first and second directions DR1, DR2). As shown in the exemplary embodiments of FIGS. 2, 4, the drain electrode 175 is spaced apart from the data line 171 (e.g., in the second direction DR2), and extends upward (e.g., in the second direction DR2) from a center of the U-shaped source electrode 173. The drain electrode 175 may be disposed on a same layer as the data line 171. The drain electrode 175 may include an expansion portion 176 that is connected with the first electrode 191.

A single gate electrode 124, a single source electrode 173, and a single drain electrode 175 form a single transistor together with the semiconductor layer 154, and a channel region of the transistor is formed in the semiconductor layer 154 between the source electrode 173 and the drain electrode 175.

Referring to the exemplary embodiments of FIG. 2 to FIG. 4, the data line 171 includes a first protruding portion 177 and a second protruding portion 179. The first protruding portion 177 and the second protruding portion 179 are areas that have a larger width (e.g., length in the first direction DR1) than other areas of the data line 171.

Referring to the exemplary embodiments of FIG. 2 to FIG. 4, the first protruding portion 177 may overlap a horizontal stem portion 192 of the first electrode 191 (e.g., in the third direction DR3). In an exemplary embodiment, a length of the first protruding portion 177 in the first direction DR1 and a length of the first protruding portion 177 in the second direction DR2 may each be in a range of about 5 μm to about 7 μm. In the case of the horizontal stem portion 192 of the first electrode 191, since the transmittance is relatively low, there may be no additional transmittance reduction even though the first protruding portion 177 is positioned in an overlapping relationship thereto.

Referring to the exemplary embodiments of FIG. 2 to FIG. 4, the second protruding portion 179 may be disposed in an area between the first gate line 121*a* and the second gate line 121*b* (e.g., in the second direction DR2). However, exemplary embodiments of the present inventive concepts are not limited thereto and the second protruding portion 179 may be disposed in any area that does not overlap the gate line 121 and the sustain electrode line 131 in areas that overlap a light blocking member 220. Since the area where the second protruding portion 179 is positioned is an area where light is blocked by the light blocking member 220, there is no additional decrease in transmittance even though the second protruding portion 179 is positioned thereon.

The first protruding portion 177 and the second protruding portion 179 provide contact portions with a repair wire for repairing the data line 171 when the data line 171 is disconnected. In an exemplary embodiment, a width of die first protruding portion 177 and a width of the second protruding portion 179 may be larger than the other portions of the data line 171, and thus they can effectively contact the repair wiring. For example, the resolution of the display device is increased and a wiring width of the data line 171 is decreased as the size of the pixel is reduced. For example, in an exemplary embodiment, the width of the data line 171 (e.g., length in the first direction DR1) in portions other than the first and second protruding portions 177, 179 may be about 4 μm. As the wire width of the data line 171 decreases in such a high resolution display device, the contact area with the repair wiring becomes smaller and it may be increasingly difficult to perform a repair. However, in the display device according to the present exemplary embodiment, the first protruding portion 177 and the second protruding portion 179, which provide an increased area for contacting the repair wire, permits the repair process to be easily performed. In this case, the first protruding portion 177 and the second protruding portion 179 are positioned in areas having lower transmittance, such as the area where the horizontal stem portion of the first electrode 191 or the light blocking member 220 is formed, and thus transmittance of the display device is not significantly affected even though the area of the first protruding portion 177 and the area of the second protruding portion 179 are increased. A repairing process using the first protruding portion 177 and the second protruding portion 179 will be described in detail later.

Figure 17:
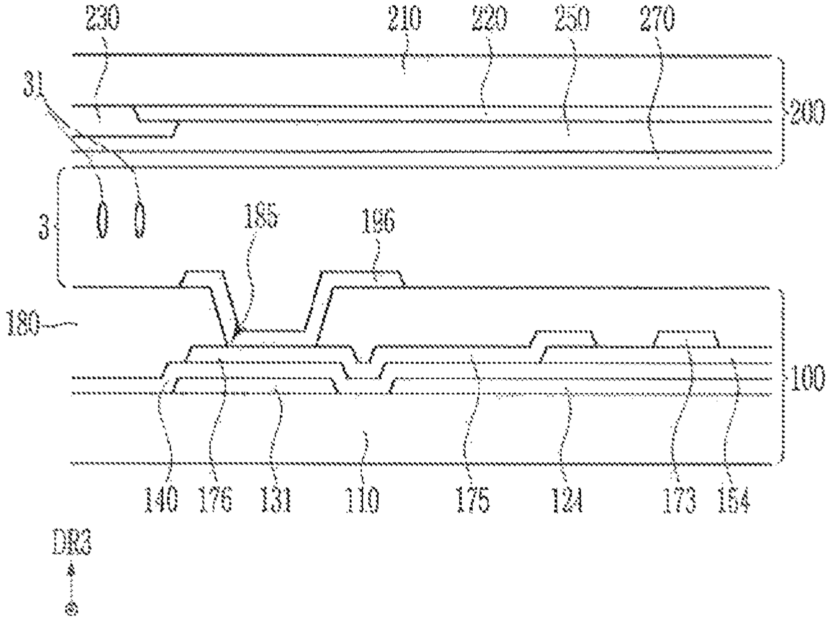
FIG. 17 is a cross-sectional view of a display device according to another exemplary embodiment of the present inventive concepts.

Referring back to the exemplary embodiments of FIG. 2 to FIG. 6, a plurality of color filters 230 are disposed on the data line 171. In an exemplary embodiment, the color filters 230 may include a red color filter, a green color filter, and a blue color filter. However, exemplary embodiments of the present inventive concepts are not limited thereto. Each color filter 230 may be positioned in an area partitioned by the crossing of the plurality of gate lines 121 with the data line 171. However, in some exemplary embodiments, an organic layer may be disposed at such crossing points instead of the color filter 230. In the exemplary embodiments of FIG. 2 to FIG. 6, the color filters 230 are disposed in the first display panel 100. However, exemplary embodiments of the present inventive concepts are not limited thereto and the color filters 230 may be disposed in the second display panel 200 in other exemplary embodiments as shown in FIG. 17.

An insulation layer 180 may be disposed on the color filter 230. In an exemplary embodiment, the insulation layer 180 may be made of inorganic insulators, organic insulators, or low dielectric constant insulators such as a silicon nitride or a silicon oxide. For example, the insulation layer 180 may be an organic layer, and the organic layer may have a thickness of in a range of about 2 μm to about 3 μm. The insulation layer 180 may prevent the material of the color filter 230 from flowing into the liquid crystal layer 3. However, exemplary embodiments of the present inventive concepts are not limited thereto and the insulation layer 180 may be omitted in some exemplary embodiments.

The insulation layer 180 and the color filter 230 include an opening 185 that overlaps the drain electrode 175. The first electrode 191 is physically and electrically connected with the drain electrode 175 through the opening 185, and receives a data voltage from the drain electrode 175 through the opening 185.

In art exemplary embodiment, the first electrode 191 may include a transparent conductor such as ITO or IZO. However, exemplary embodiments of the present inventive concepts are not limited thereto.

The first electrode 191 may include the horizontal stem portion 192 that extends in the first direction DR1, and a vertical stem portion 193 that extends in the second direction DR2 and crosses the horizontal stem portion 192. In addition, the first electrode 191 may include a minute branch portion 194 that extends from the horizontal stem portion 192 and the vertical stem portion 193. As shown in the exemplary embodiment of FIG. 2, the minute branch portion 194 may extend in an oblique direction with respect to the horizontal stem portion 192 and the vertical stem portion 193. Edges of the minute branch portions 194 may be connected to each other by an outer edge portion 195. The first electrode 191 may be connected with the expansion portion 176 of the drain electrode 175 in the protrusion portion 196 of the first electrode 191.

The first electrode 191 may further include a horizontal portion 197 that is parallel with and extends in the first direction DR1. In addition, the first electrode 191 may further include a shielding portion 198 that is disposed on the same layer as the first electrode 191 and extends substantially in the first direction DR1 while being disposed apart from the first electrode 191. For example, as shown in the exemplary embodiment of FIG. 2, the shielding portion 198 may be spaced apart from the first electrode 191 in the second direction DR2. However, exemplary embodiments of the present inventive concepts are not limited thereto and the horizontal portion 197 and the shielding portion 198 may be omitted in other exemplary embodiments.

A portion of the minute branch portion 194 of the first electrode 191 may not be connected with the outer edge portion 195. In addition, the protrusion portion 196 and the vertical stem portion 193 of the first electrode 191 may be disposed apart from each other (e.g., in the second direction DR2). This structure may improve the orientation of the liquid crystal molecules 31 of the liquid crystal layer 3 at the edge of the first electrode 191. In an exemplary embodiment, the first electrode 191 may be a pixel electrode, and may receive a pixel voltage from the drain electrode 175. However, exemplary embodiments of the present inventive concepts are not limited thereto.

Referring to the exemplary embodiments of FIG. 2 to FIG. 6, the second display panel 200 will be described. The second display panel 200 includes the light blocking member 220 that is disposed on the second substrate 210. In an exemplary embodiment, the second display panel 200 may be made of transparent glass or plastic. The light blocking member 220 includes an opening in an area overlapping the first electrode 191 of the first display panel 100 (e.g., in the third direction DR3). In FIG. 2, an area where the light blocking member 220 is disposed and an area where the light blocking member 220 is not disposed are divided, and the light blocking member 220 may overlap the data line 171, the gate line 121, and the like and may not overlap a majority of the first electrode 191.

An overcoat 250 may be disposed on the light blocking member 220. For example, as shown in the exemplary embodiment of FIG. 6, an upper surface of the overcoat 250 may directly contact a lower surface and a lateral side surface of the light blocking member 220. However, exemplary embodiments of the present inventive concepts are not limited thereto and the overcoat 250 may be omitted in some exemplary embodiments. A second electrode 270 is disposed on the overcoat 250. In an exemplary embodiment, the second electrode 270 may be a common electrode, and may receive a common voltage.

The liquid crystal layer 3 includes liquid crystal molecules 31. The liquid crystal molecules 31 of the liquid crystal layer 3 are oriented by a voltage between the first electrode 191 and the second electrode 270 such that an image may be displayed.

The display device according to an exemplary embodiment of the present inventive concepts includes the first protruding portion 177 and the second protruding portion 179 of the data line 171 that have a larger width (e.g., length in the first direction DR1) than other areas of the data line 171 and are expanded as compared to the other areas of the data line 171. The first protruding portion 177 and second protruding portion 179 are areas that contact the repair wiring during a repair process when the data line 171 is disconnected, and the first protruding portion 177 and the second protruding portion 179 have larger widths (e.g., length in the first direction DR1) than the data line 171 and thus may more stably contact the repair wiring.

Figure 7:
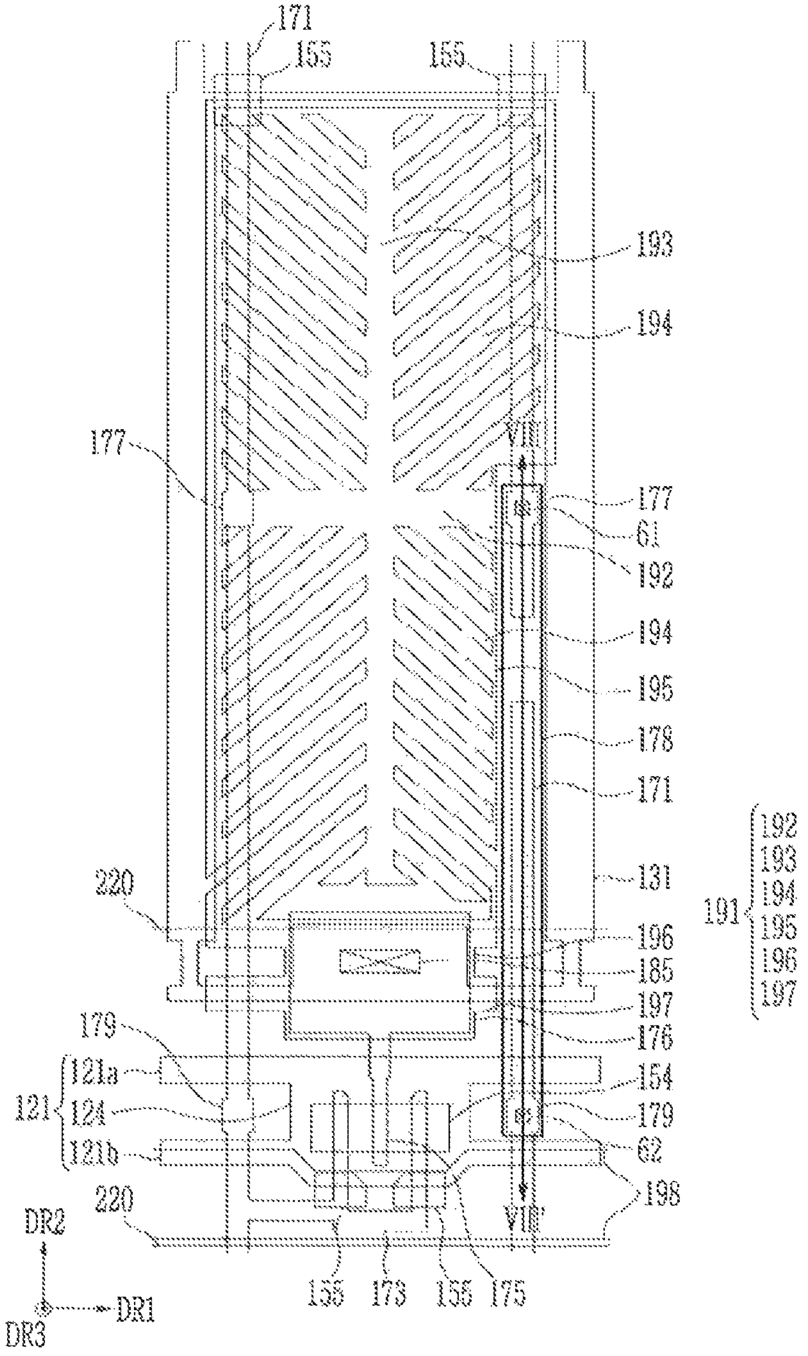
FIG. 7 is a layout view of the display device having a repaired pixel according to an exemplary embodiment of the present inventive concepts.

Hereinafter, a repaired pixel will be described with reference to the accompanying drawings. FIG. 7 shows the same area as FIG. 2 with respect to a repaired pixel. Detailed descriptions of substantially identical elements already described with respect to the above-described exemplary embodiments and the same constituent elements will be omitted for convenience of explanation.

Referring to the exemplary embodiment of FIG. 7, a portion of the data line 171 is disconnected. In addition, a repair wire 178 may be positioned to overlap (e.g., in the third direction DR3) the disconnected portion of the data line 171. A first end of the repair wire 178 contacts the first protrusion portion 177 through a first opening 61, and the second end that is opposite to the first end (e.g., in the second direction DR2) contacts the second protruding portion 179 of the data line 171 through a second opening 62. In this embodiment, a portion of the first electrode 191, disposed in an area where the repair wire 178 is disposed, is removed. For example, as shown in the exemplary embodiment of FIG. 7, a portion of the data line 171 extending in the second direction DR2 along the right side (e.g., in the first direction DR1) of the first electrode 191 may be removed in a portion that is below the horizontal stem portion 192. Since the disconnected data line 171 is connected by the repair wire 178, the disconnection of the data line 171 can be repaired.

FIGS. 8A-8D are cross-sectional views of the display device, taken along the line VIII-VIII' of FIG. 7.

Figure 8A:
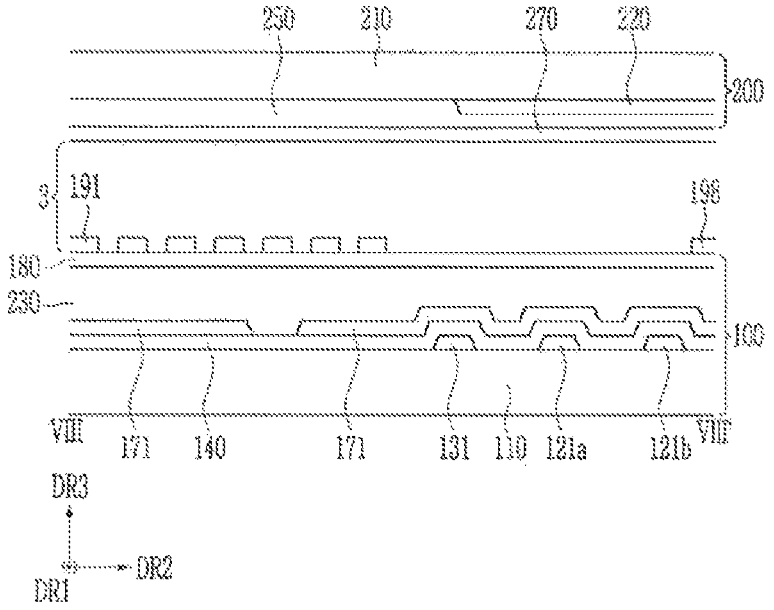
FIGS. 8A-8D are cross-sectional views of a display device having a repair process performed thereon taken along line VIII-VIII' of FIG. 7 according to exemplary embodiments of the present inventive concepts.
Figure 8B:
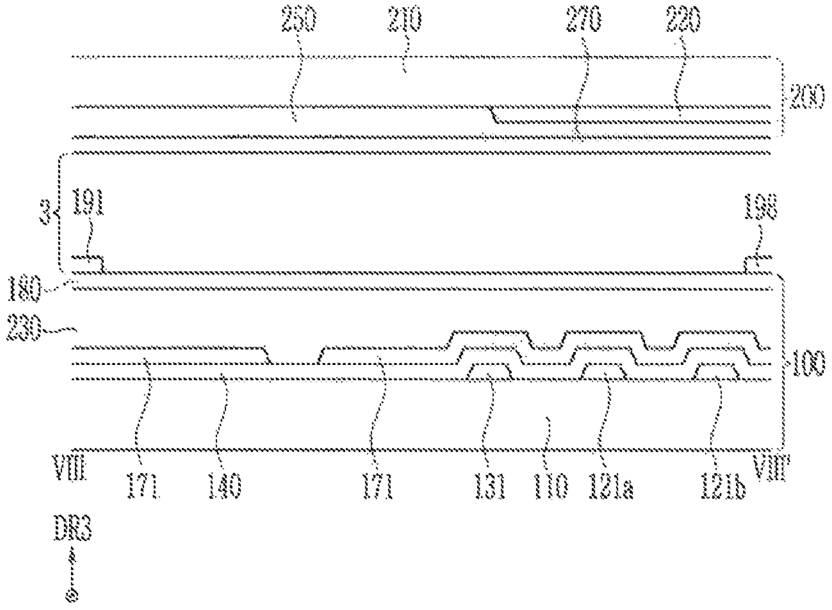
Figure 8C:
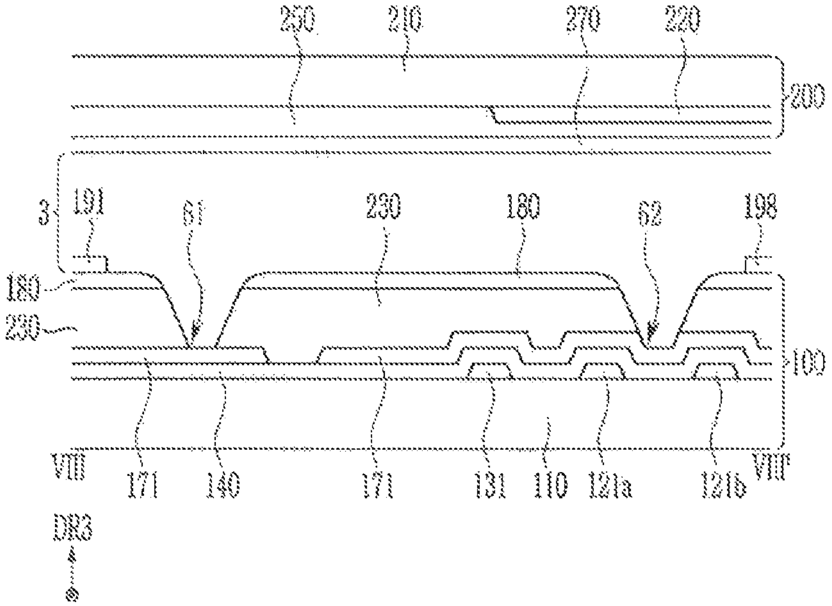

Simultaneously referring to the exemplary embodiments of FIG. 7 and FIGS. 8A-8D, the data line 171 is partially disconnected. In addition, as shown in FIG. 8C, the first opening 61 is disposed in the color filter 230 and the insulation layer 180 on the first protruding portion 177 of the data line 171. Further, the second opening 62 is disposed in the color filter 230 and the insulation layer 180 of the second protruding portion 179. The repair wire 178 contacts the data line 171 in the first opening 61, and contacts the data line 171 in the second opening 62. Therefore, the disconnected data line 171 is connected by the repair wire 178.

Simultaneously referring to the exemplary embodiments of FIG. 7 and FIGS. 8A-8D, the first electrode 191 in the area where the repair wire 178 is formed is removed. The removal of the first electrode 191 provides a sufficient space for formation of the repair wire 178 therein. A repaired pixel where the repair wire 178 is formed is turned off to prevent light emission, and accordingly, transmittance deterioration may not occur even though the repair wire 178 is formed and the first electrode 191 is partially removed.

More specifically, referring to FIG. 8A, a data line 171 is disconnected in a display device.

As shown in the exemplary embodiment of FIG. 8B, first electrodes 191 in an area overlapping a data line 171 are removed.

As shown to the exemplary embodiment of FIG. 8C, a first opening 61 and a second opening 62 are formed to extend through an insulation layer 180 and a color filter 230 to expose portions of the data line 171. The first opening 61 and the second opening 62 overlap respective portions of the data line 171 that are disconnected from each other.

Figure 8D:
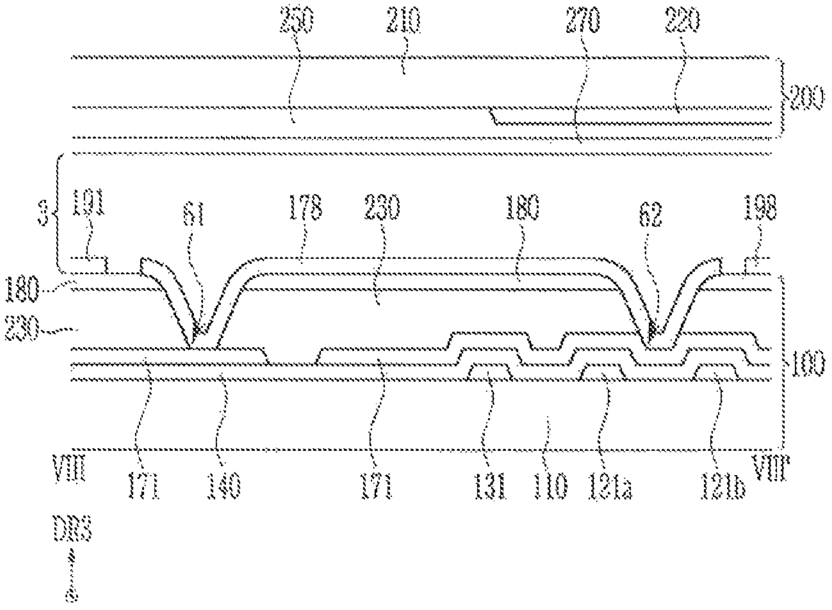

As shown in the exemplary embodiment of FIG. 8D, a repair wire 178 is formed. The repair wire 178 is formed in an area where the first electrode 191 is removed in the previous step shown in FIG. 8B, and is connected with the data line 171 through the first opening 61 and the second opening 62. Therefore, the disconnected data lines 171 are connected to each other through the repair wire 178, such that the wiring is repaired.

Figure 9:
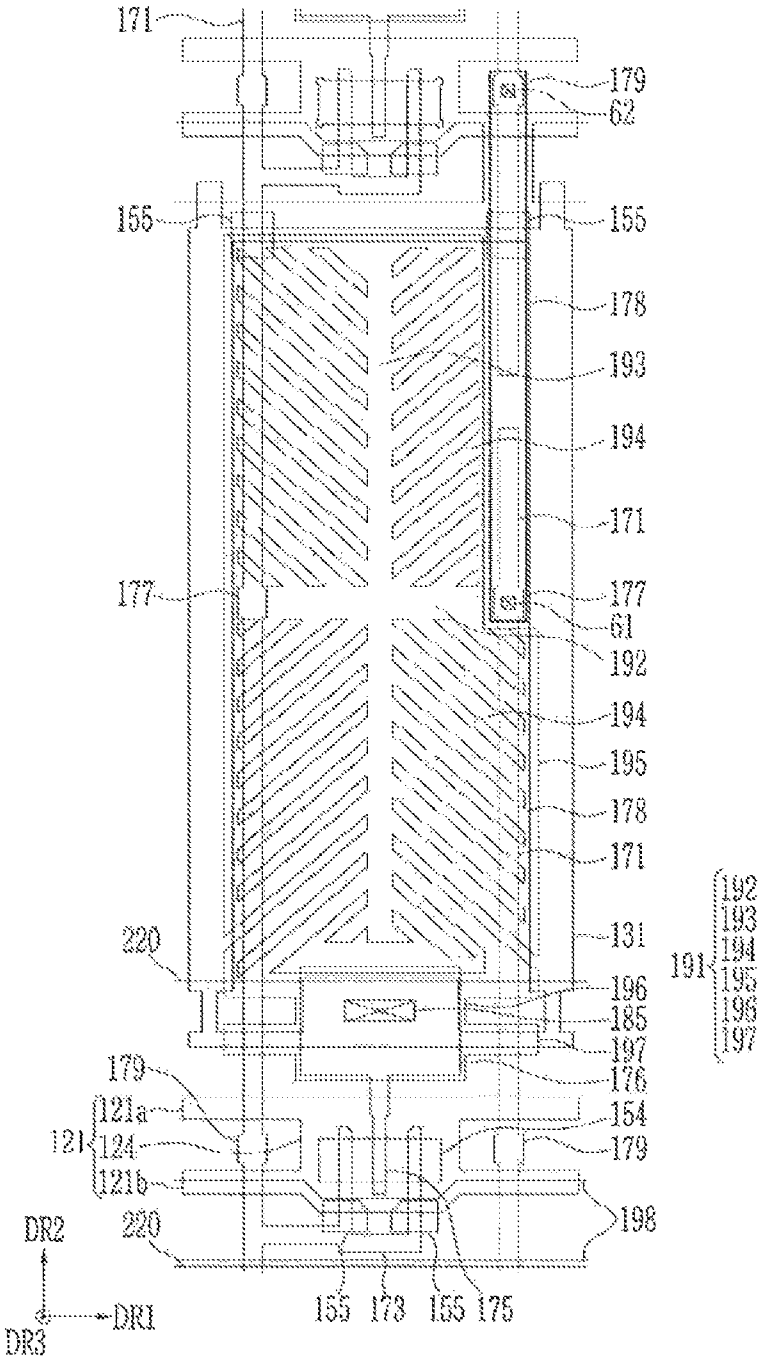
FIG. 9 is a layout view of the display device having a repaired pixel according to another exemplary embodiment of the present inventive concepts.

In the exemplary embodiment of FIG. 7, the data line 171 is disconnected in an area between the first protruding portion 177 and the second protruding portion 179. However, in other exemplary embodiments in which the data line 171 is disconnected in another area, the formation and connection of the repair wire 178 is the same. For example, FIG. 9 shows an exemplary embodiment in which a disconnection of the data line 171 occurs between a second protruding portion 179 of a neighboring pixel and a first protrusion portion 177 of the corresponding pixel. In the exemplary embodiment of FIG. 9, a repair wire 178 is similarly connected with the data line 171 through a first opening 61 and a second opening 62.

In the exemplary embodiment of FIG. 7, the second protruding portion 179 is disposed in the area between the first gate line 121*a* and the second gate line 121*b*. However, the second protruding portion 179 may be positioned in any area as long as the area does not overlap other wires among areas that overlap the light blocking member 220.

Figure 10:
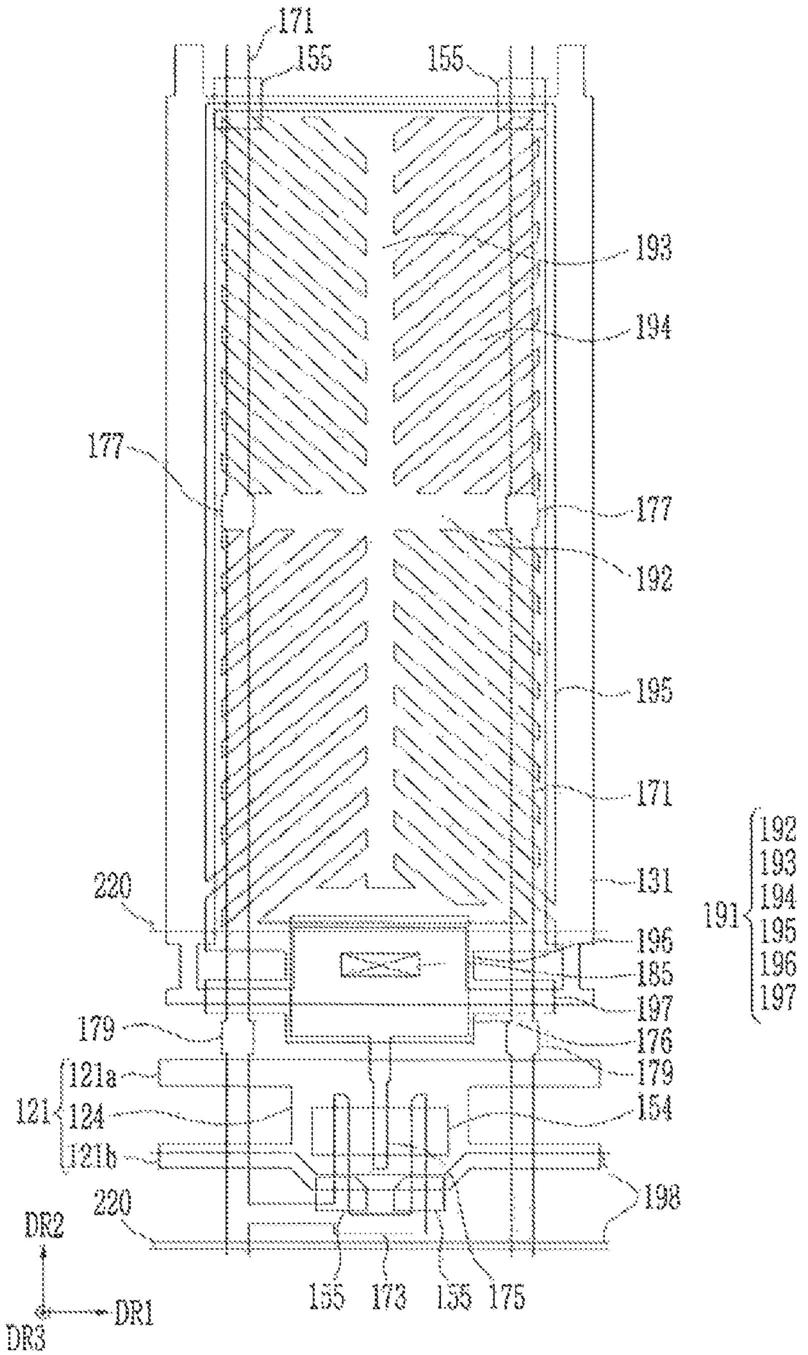
FIG. 10 is a layout view of the display device according to another exemplary embodiment of the present inventive concepts.

FIG. 10 illustrates the same area as FIG. 2 with respect to another exemplary embodiment. Referring to FIG. 10, a display device according to the present exemplary embodiment is the same as the display device according to the exemplary embodiment of FIG. 2, except that a second protruding portion 179 is disposed between a sustain electrode line 131 and the first gate line 121*a* (e.g., in the second direction DR2) and is not disposed between a first gate line 121*a* and a second gate line 121*b*. A detailed description of the substantially identical elements described with respect to the exemplary embodiments of FIGS. 1-9 will be omitted for convenience of explanation. Referring to the exemplary embodiment of FIG. 10, the second protruding portion 179 is disposed between the sustain electrode line 131 and the first gate line 121*a* (e.g., in the second direction DR2). In this exemplary embodiment, when a data line 171 is disconnected, the disconnected data line 171 may be repaired a similar manner as in the exemplary embodiment of FIG. 7 to FIG. 9.

Figure 11:
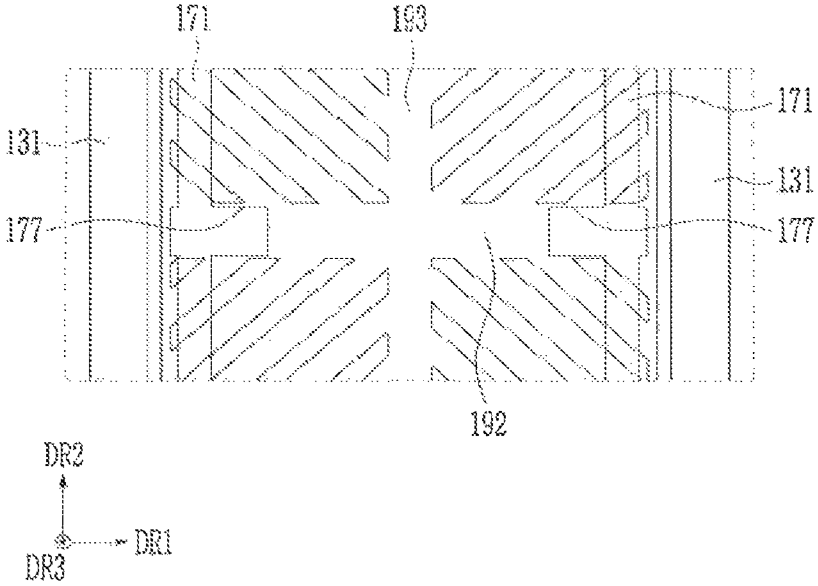
FIG. 11 is a partial layout view of the display device according to another exemplary embodiment of the present inventive concepts.

In addition, the shape and the area of the first protruding portion 177 is not limited to those shown in the exemplary embodiment of FIG. 2. FIG. 11 shows the same area as FIG. 3 with respect to a display device according to another exemplary embodiment. Referring to FIG. 11, in a display device according to the present exemplary embodiment, the first protruding portion 177 protrudes longer in the first direction DR1) in towards the center of the first electrode 191 and overlapping the horizontal stem portion 192 of the first electrode 191. For example, in the exemplary embodiment of FIG. 3, the first protruding portion 177 is formed in the shape of a square of which the horizontal width and the vertical width are similar to each other. In contrast, in the exemplary embodiment of FIG. 11, a first protruding portion 177 may be formed in the shape of a rectangle of which a length that the first protruding portion 177 extends in a first direction DR1 is longer than a length that the first protruding portion 177 extends in a second direction DR2. In this exemplary embodiment, an area where a repair wire 178 may contact the disconnected data line 171 is increased compared to the contact area in the exemplary embodiments of FIG. 2 and FIG. 3, and thus repairing the data line 171 may be more easily carried out. For example, a repairing process may be more easily performed compared to the above-described exemplary embodiment based on the greater contact area of the first protruding portion 177.

Figure 12:
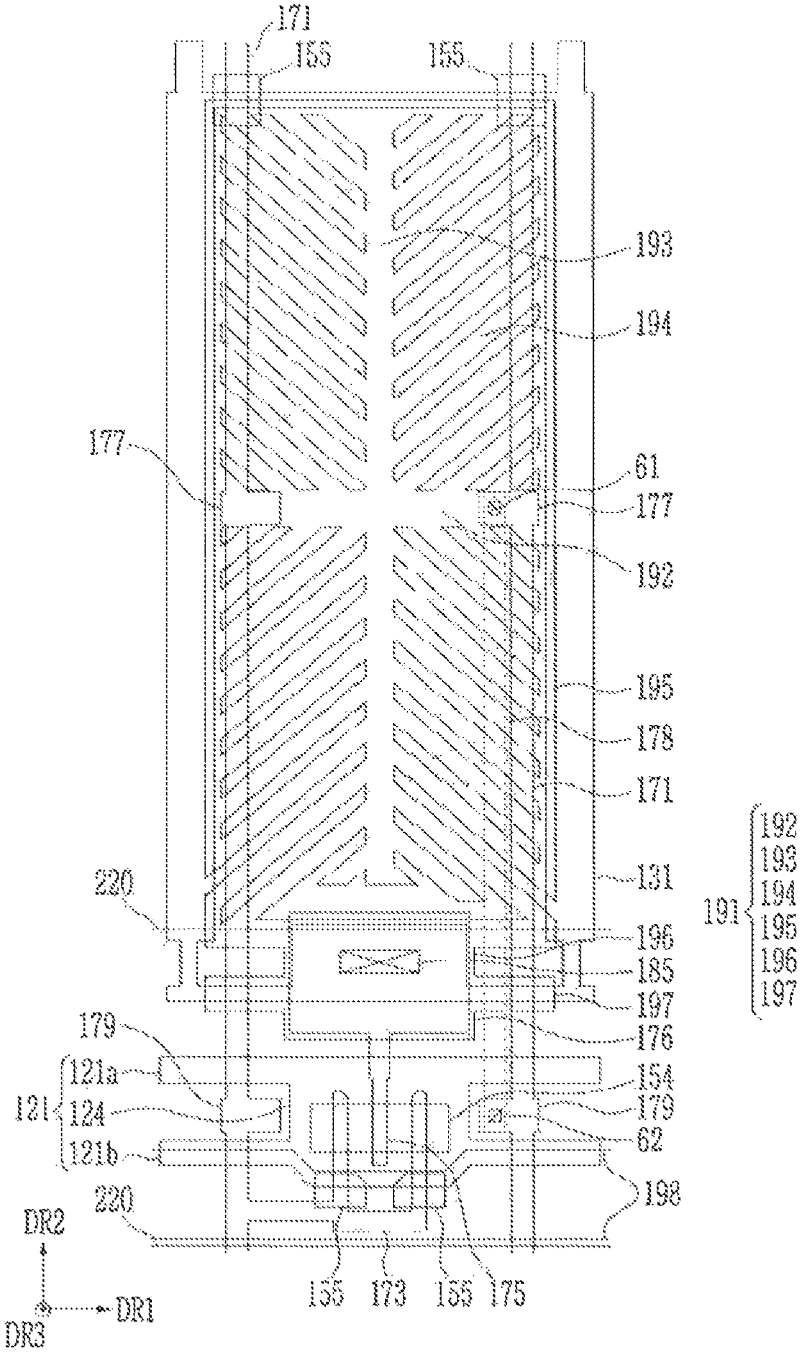
FIG. 12 is a layout view of the display device according to another exemplary embodiment of the present inventive concepts.

FIG. 12 illustrates the same area as FIG. 2 with respect to an exemplary embodiment that includes the exemplary embodiment of FIG. 11. Referring to FIG. 12, a length of a first protruding portion 177 in a first direction DR1 may be relatively greater than the length in the second direction DR2, and a length of a second protruding portion 179 in the first direction DR1 may be relatively greater than the length in the second direction DR2. In the exemplary embodiment of FIG. 12, a connection shape where a repair wire 178 is formed is marked by the dotted line. When the data line 171 is disconnected and thus the repair wire 178 is formed, the repair wire 178 may not overlap the data line 171 (e.g., in the third direction DR3) as shown in FIG. 12. For example, the first and second protruding portions 177, 179 may provide a connection shape where the repair wire 178 is formed which is spaced apart from the data line 171 in the first direction DR1. A pixel where the repair wire 178 is formed is a pixel in a turned-off state, and thus even though the repair wire 178 is positioned in a light emission area of the pixel, the display quality is not reduced.

Figure 13:
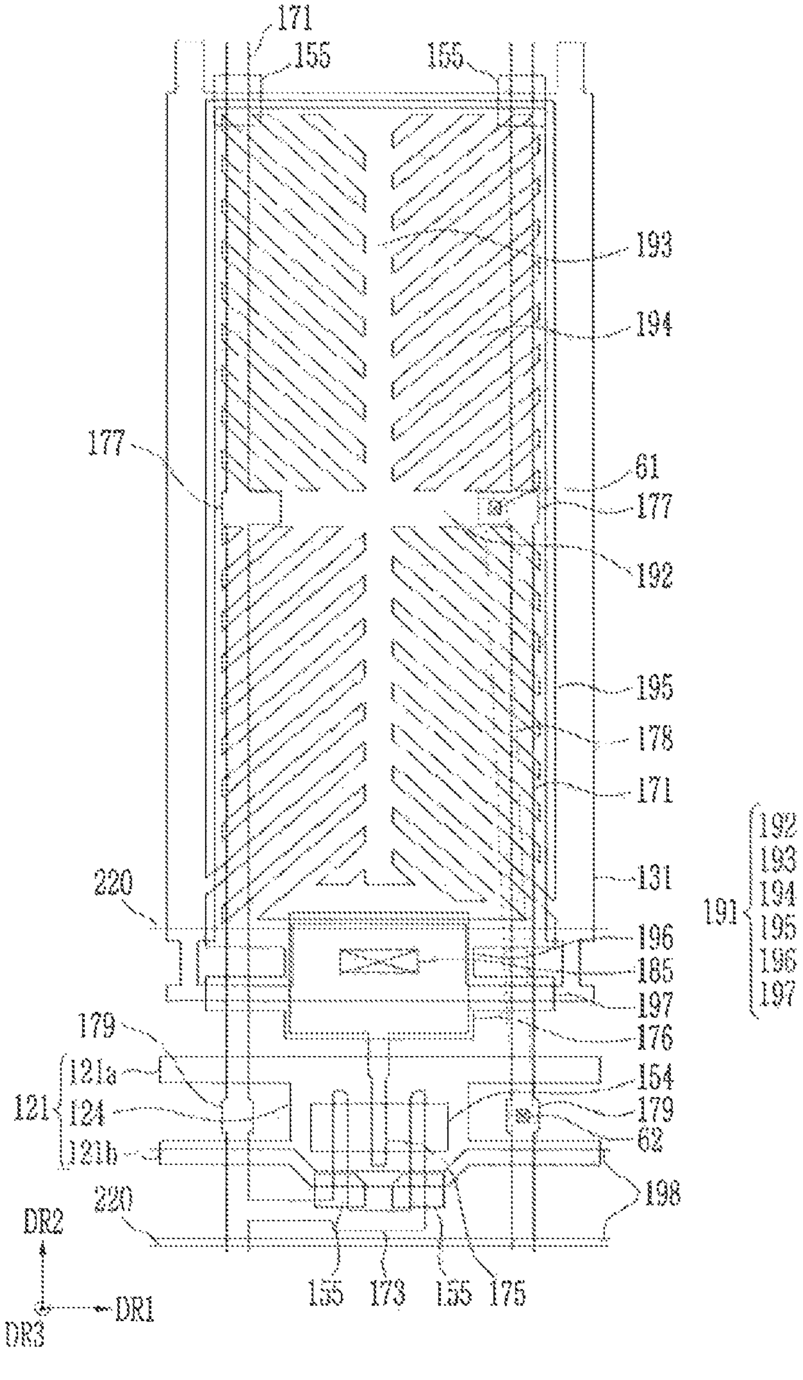
FIG. 13 is a layout view of the display device according to another exemplary embodiment of the present inventive concepts.

FIG. 13 illustrates the same area as FIG. 2 with respect to an exemplary embodiment that includes the exemplary embodiment of FIG. 11. In the exemplary embodiment of FIG. 13, a length of a first protruding portion 177 in a first direction DR1 is relatively greater than the length in the second direction DR2, and a second protruding portion 179 array be the same as the second protruding portion of the exemplary embodiment of FIG. 2. In this exemplary embodiment, a connection shape where a repair wire 178 is formed is marked by the dotted line. As shown in FIG. 13, the repair wire 178 may be connected with a data line in a diagonal shape, and as previously described, since a pixel where the repair wire 178 is formed is a pixel in a turned-off state, even though the repair wire 178 is positioned in a light emission area of the pixel, the display quality is not reducer.

As shown in the exemplary embodiments of FIG. 12 and FIG. 13, when the repair wire 178 does not overlap the data line 171 or only partially overlaps the data line 171, an area for contact of the repair wire 178 and the data line 171 is increased, thereby contact may be more easily performed and repairing may be more easily carried out.

Figure 14:
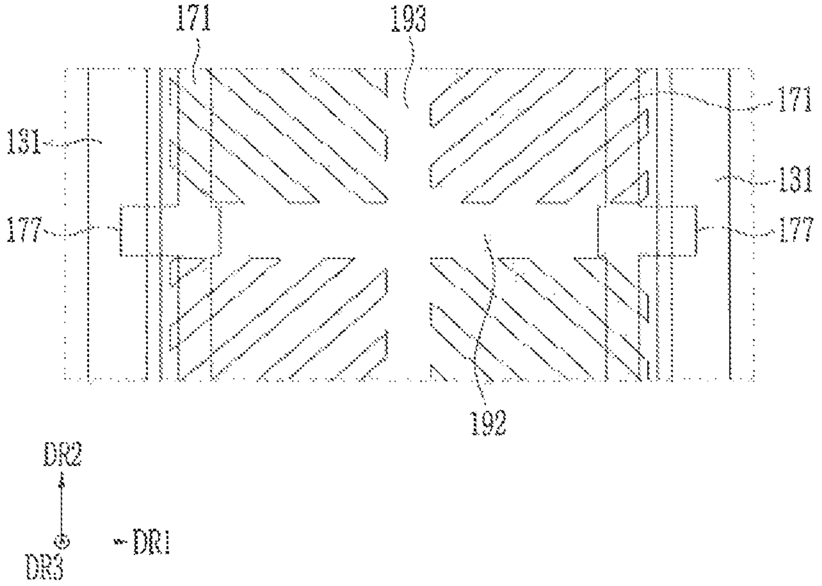
FIG. 14 is a partial layout view of the display device according to another exemplary embodiment of the present inventive concepts.

FIG. 14 shows the same area as FIG. 3 with respect to another exemplary embodiment. Referring to FIG. 14, in a display device according to the present exemplary embodiment, a first protruding portion 177 protrudes in a first direction DR1 away from the center portion of the first electrode 191 to overlap a sustain electrode line 131. For example, in the exemplary embodiment of FIG. 3, the first protruding portion 177 is formed in the shape of a square of which the horizontal width (e.g., length in the first direction DR1) and the vertical width (e.g., length in the second direction DR2) are similar to each other. In the exemplary embodiment of FIG. 11, the first protruding portion 177 protrudes in the first direction DR1 towards a center portion of the first electrode 191 and the relatively longer portion overlaps the horizontal stem portion 192. However, in the case of the exemplary embodiment of FIG. 14, the first protruding portion 177 may be formed in the shape of a rectangle of which a length in the first direction DR1 is longer than a length in the second direction DR2 and the relatively longer portion extends away from the center of the first electrode to overlap the sustain electrode line 131. In this exemplary embodiment, an area where a repair wire 178 may contact a disconnected data line 171 is increased compared to the exemplary embodiment of FIG. 2, and thus repairing may be more easily carried out. For example, a repairing process may be more easily performed as compared to the previous exemplary embodiment.

Figure 15:
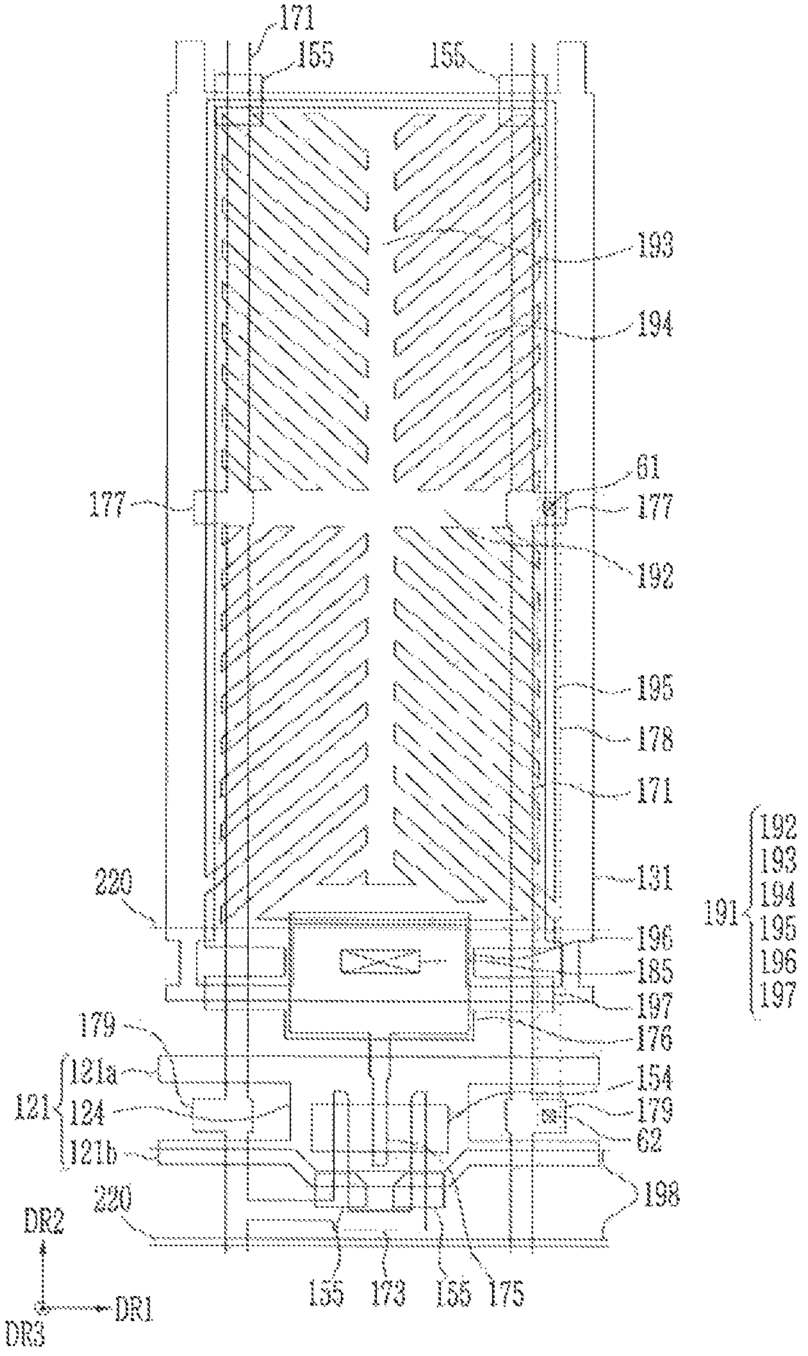
FIG. 15 is a layout view of the display device according to another exemplary embodiment of the present inventive concepts.

FIG. 15 shows the same area as FIG. 2 with respect to another exemplary embodiment. Referring to the exemplary embodiment of FIG. 15, a length of a first protruding portion 177 in a first direction DR1 may be relatively greater than the length in the second direction DR2 and a length of a second protruding portion 179 in the first direction DR1 may be relatively greater than the length in the second direction DR2. As shown in the exemplary embodiment of FIG. 15, the second protruding portion may protrude in the first direction DR1 in a direction away from the drain electrode 175. In FIG. 15, a connection shape of a repair wire 178 is marked by the dotted line. When the data line 171 is disconnected and thus the repair wire 178 is formed for a repair process, the repair wire 178 may not overlap the data line 171 as shown in the exemplary embodiment of FIG. 15.

Figure 16:
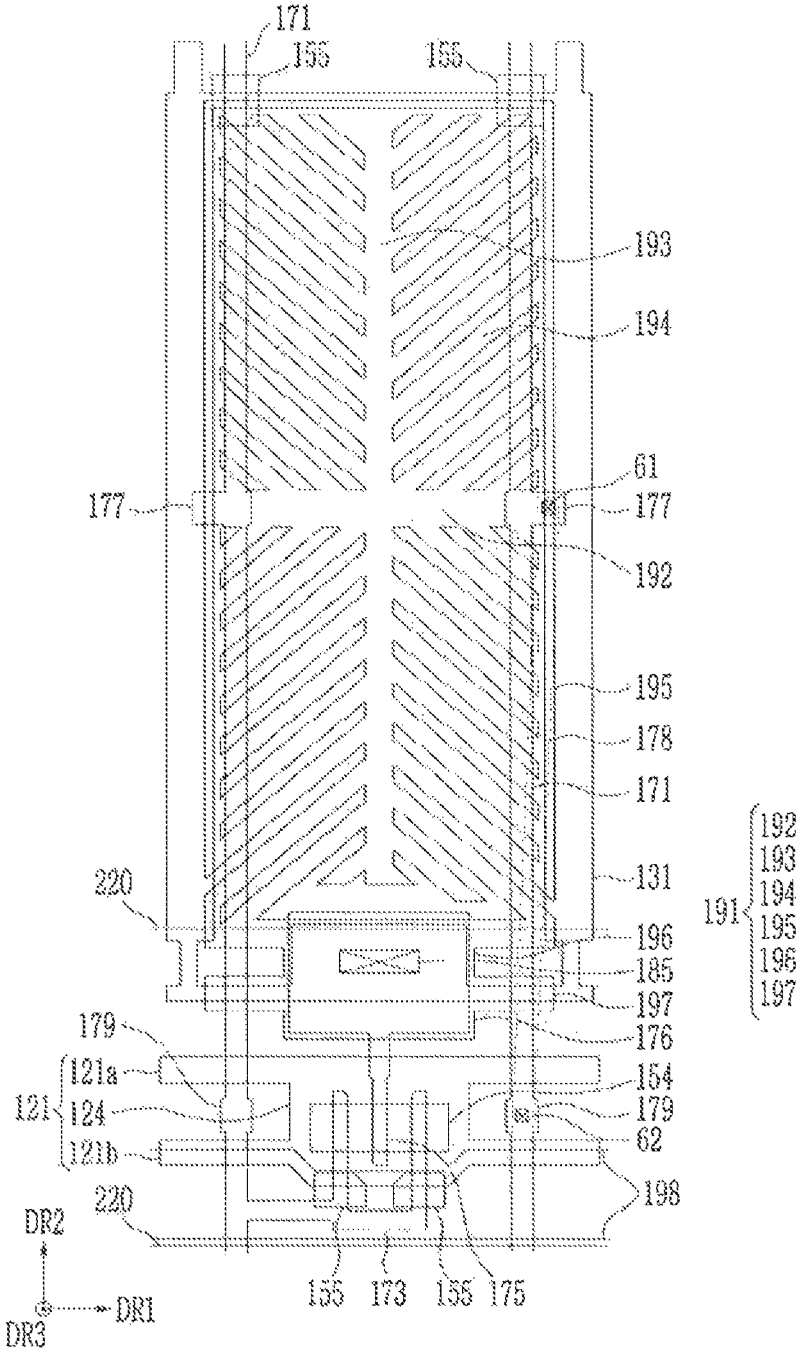
FIG. 16 is a layout view of the display device according to another exemplary embodiment of the present inventive concepts.

FIG. 16 shows the same area as FIG. 2 with respect to another exemplary embodiment including the exemplary embodiment of FIG. 14. In case of the exemplary embodiment of FIG. 16, a length of a first protruding portion 177 in a first direction DR1 is relatively greater than the length in the second direction DR2, and a second protruding portion 179 may be the same as the second protruding portion of the exemplary embodiment of FIG. 2. In this exemplary embodiment, a connection shape when a repair wire 178 is formed is marked by the dotted line. As shown in FIG. 16, the repair wire 178 may be connected to a data line 171 in a diagonal form.

As shown in the exemplary embodiments of FIG. 15 and FIG. 16, when the repair wire 178 does trot overlap the data line 171 or partially overlaps the data line 171, an area for contact of the repair wire 178 and the data line 171 is increased, and contact may be easily performed and repairing may be more easily carried out.

Hereinabove, numerous variations of the first protruding portion 177 and the second protruding portion 179 have been described, but the shapes of the first protruding portion 177 and the second protruding portion 179 are not limited thereto. For example, the first protruding portion 177 and the second protruding portion 179 may be positioned anywhere as long as they do not reduce the transmittance of the pixel. For example, the first protruding portion 177 may be positioned to overlap a different portion of the first electrode 191 having a relatively lower transmittance other than an area overlapping the horizontal stem portion 192. For example, the first protruding portion 177 may overlap another area that overlaps the light blocking member 220 which does not overlap the gate line 121 and the sustain electrode line 131.

Furthermore, the first protruding portion 177 and the second protruding portion 179 may have a variety of different shapes in which the contact area for the repair wire 178 to contact the disconnected data line 171 is increased and is not limited to a square or rectangular shape. Furthermore, the first protruding portion 177 and the second protruding portion 179 may have a relatively larger width in directions other than the first direction DR1, such as a direction between the first direction DR1 and the second direction DR2.

Hereinabove, the color filter 230 of the display device is disposed in the first display panel 100. However, exemplary embodiments of the present inventive concepts is not limited thereto. For example, the color filter 230 may be located in the second display panel 200.

FIG. 17 shows the same cross-section as FIG. 5 in a display device according to another exemplary embodiment. The display device according to the exemplary embodiment of FIG. 17 is the same as the exemplary embodiment of FIG. 5, except that a color filter 230 is disposed in the second display panel 200 and is not disposed in the first display panel 100. A detailed description of substantially identical elements described with respect to the exemplary embodiments of FIGS. 1-16 will be omitted for convenience of explanation.

Referring to the exemplary embodiment of FIG. 17, an insulation layer 180 is disposed between source and drain electrodes 173 and 175 and a protruding portion 196 of a first electrode in the first display panel 100. The color filter 230 may be disposed on a second substrate 210 on the second display panel 200.

The display devices according to all of the above-described exemplary embodiments may be applied to the cross-section shown in FIG. 17. For example, the display devices of the above-described various exemplary embodiments can be applied not to a structure in which the color filter 230 is disposed in the first display panel 100 but to a structure in which the color filter 230 is disposed in the second display panel 200 as shown in the exemplary embodiment of FIG. 17.

While the present inventive concepts have been described in connection with exemplary embodiments, it is to be understood that the present inventive concepts are not limited to the disclosed exemplary embodiments. On the contrary, it is intended to cover various modifications and equivalent arrangements and the present inventive concepts are not limited thereto.

What is claimed is:

1. A display device comprising:

a first substrate;

a gate line disposed on the first substrate and extending in a first direction;

a data line disposed on the first substrate and extending in a second direction that crosses the first direction;

a drain electrode disposed on the first substrate; and a first electrode that is configured to connect with the drain electrode, the first electrode includes a first stem portion that extends in the first direction and a second stem portion that crosses the first stem portion and extends on both sides of the first stem portion in the second direction, the gate line comprises a first gate line and a second gate line that each extend in the first direction and are spaced apart from each other in the second direction, the first and second gate lines are both disposed below the second stem portion in the second direction, the data line includes a first protruding portion and a second protruding portion, the first protruding portion and the second protruding portion having a larger width in the first direction than other portions of the data line, the first protruding portion overlaps the first stem portion of the first electrode in a third direction that is perpendicular to an upper surface of the first substrate, and the second protruding portion is positioned between the first gate line and the second gate line.

2. The display device of claim 1, wherein a gate electrode is configured to connect the first gate line and the second gate line.

3. The display device of claim 1, further comprising:

a sustain electrode line that is disposed on a same layer as the gate line, wherein a first portion of the sustain electrode line extends in the first direction in parallel with the gate line, and wherein the second protruding portion is disposed between the first portion of the sustain electrode line and the gate line.

4. The display device of claim 1, wherein widths of the first protruding portion and the second protruding portion in the first direction are in a range of about 5 μm to about 7 μm.

5. The display device of claim 1, further comprising:

a sustain electrode line that is disposed in a same layer as the gate line, wherein a first portion of the sustain electrode line extends in the second direction in parallel with the data line; and the first protruding portion overlaps the first portion of the sustain electrode line in the third direction.

6. The display device of claim 1, wherein the data line includes first and second data lines disposed at opposite lateral edges of the first electrode; and the first electrode is configured to receive a data voltage from one data line of the first and second data lines.

7. The display device of claim 1, wherein the first protruding portion protrudes towards a center of the first electrode, and the second protruding portion protrudes towards the drain electrode.

8. The display device of claim 1, wherein the first protruding portion protrudes away from a center of the first electrode, and the second protruding portion protrudes away from the drain electrode.

9. The display device of claim 1, wherein the first electrode further comprises:

a minute branch portion that extends from the first stem portion and the second stem portion; and a protrusion portion that is connected with the drain electrode, wherein the protrusion portion and the second stem portion are spaced apart from each other.

10. A display device comprising:

a first substrate;

a plurality of gate lines disposed on the first substrate and extending in a first direction;

a plurality of data lines disposed on the first substrate and extending in a second direction that crosses the first direction, the plurality of data lines including a first protruding portion and a second protruding portion each having a larger width in the first direction than other portions of the plurality of data lines;

an insulation layer disposed on the plurality of data lines, the insulation layer including a first opening overlapping the first protruding portion and a second opening overlapping the second protruding portion;

a first electrode disposed on the insulation layer; and a repair wire disposed on the insulation layer and overlapping a portion of a first data line of the plurality of data lines, wherein the repair wire is configured to contact the first data line in the first opening overlapping the first protruding portion, and contact the first data line in the second opening overlapping the second protruding portion, wherein the first electrode comprises a first stem portion that is parallel with the first direction and a second stem portion that crosses the first stem portion and extends on both sides of the first stem portion in the second direction, wherein the plurality of gate electrodes includes a first gate line and a second gate line that each extend in the first direction and are spaced apart from each other in the second direction, the first and second gate lines are both disposed below the second stem portion in the second direction, wherein the first protruding portion overlaps the first stem portion of the first electrode in a third direction that is perpendicular to an upper surface of the first substrate, and wherein the second protruding portion is disposed between the first gate line and the second gate line.

11. The display device of claim 10, wherein the first electrode further comprises:

a minute branch portion that is extended from the first stem portion and the second stem portion, and the first electrode and the repair wire do not overlap each other in the third direction.

12. The display device of claim 10, wherein the plurality of gate lines further comprises:

a gate electrode that is configured to connect the first gate line and the second gate line.

13. The display device of claim 10, further comprising a sustain electrode line that is disposed on a same layer as the gate line, wherein a first portion of the sustain electrode line extends in a first direction in parallel with the gate line, and the second protruding portion is disposed between the first portion of the sustain electrode line and a first gate line of the plurality of gate lines.

14. The display device of claim 10, wherein the first electrode is configured to connect with a drain electrode that is disposed on a same layer as the plurality of data lines, the first protruding portion protrudes towards a center of the first electrode, and the second protruding portion protrudes towards the drain electrode.

15. The display device of claim 10, wherein:

the first electrode is configured to connect with a drain electrode that is disposed on a same layer as the plurality of data lines;

the first protruding portion protrudes away from a center of the first electrode; and the second protruding portion protrudes away from the drain electrode.

16. The display device of claim 10, wherein the first data line of the plurality of data lines overlaps the repair wire and includes a disconnected area between the first protruding portion and the second protruding portion.

17. The display device of claim 10, wherein the repair wire extends in parallel with the first data line.

18. The display device of claim 10, wherein the repair wire does not extend in parallel with the first data line.

19. The display device of claim 18, wherein one pixel is comprised of a first gate line of the plurality of gate lines, the first data line of the plurality of data lines, and a first electrode that is configured to receive a voltage from the first data line; and a pixel where the repair wire is disposed is not configured to emit light during operation of the display device.

20. The display device of claim 10, wherein the repair wire is a separate wire that is solely electrically connected to the first protruding portion and the second protruding portion of the display device.

21. A display device comprising:

a first substrate;

a gate line disposed on the first substrate and extending in a first direction;

a data line disposed on the first substrate and extending in a second direction that crosses the first direction, the data line including a first protruding portion and a second protruding portion that are spaced apart from each other and each have a larger width than other portions of the data line;

a drain electrode disposed on the first substrate; and a first electrode that is configured to connect with the drain electrode, wherein the first protruding portion and the second protruding portion form a connection shape therebetween, the connection shape is configured for receiving a repair wire that directly contacts the first and second protruding portions;

wherein the first protruding portion and the second protruding portion have an increased contact area for directly contacting the repair wire, wherein the repair wire is a separate wire that is solely electrically connected to the first protruding portion and the second protruding portion of the display device.

* * * * *